US008285897B2

(12) United States Patent
Weigold et al.

(10) Patent No.: US 8,285,897 B2
(45) Date of Patent: *Oct. 9, 2012

(54) SYNCHRONIZED MULTICHANNEL UNIVERSAL SERIAL BUS

(76) Inventors: Adam Mark Weigold, Unley (AU);
Patrick Klovekorn, Myrtle Bank (AU);
Peter Graham Foster, Belair (AU);
Clive Alexander Goldsmith, Northfield (AU)

( * ) Notice: Subject to any disclaimer, the term of this patent is extended or adjusted under 35 U.S.C. 154(b) by 549 days.

This patent is subject to a terminal disclaimer.

(21) Appl. No.: 11/271,799

(22) Filed: Nov. 14, 2005

(65) Prior Publication Data
US 2006/0064522 A1 Mar. 23, 2006

Related U.S. Application Data

(62) Division of application No. 10/620,769, filed on Jul. 17, 2003, now Pat. No. 7,539,793.

(60) Provisional application No. 60/396,099, filed on Jul. 17, 2002.

(51) Int. Cl.
*G06F 13/42* (2006.01)
*G06F 13/00* (2006.01)
*G06F 1/04* (2006.01)
*G06F 1/12* (2006.01)
*H04L 7/00* (2006.01)

(52) U.S. Cl. .............. 710/61; 710/15; 710/29; 710/58; 710/100; 710/305; 710/313; 713/400; 713/401; 713/500; 713/600

(58) Field of Classification Search .............. 710/15, 710/29, 58, 61, 100, 305, 313; 713/400, 713/401, 500, 600
See application file for complete search history.

(56) References Cited

U.S. PATENT DOCUMENTS

| | | | | |
|---|---|---|---|---|
| 5,761,537 A * | 6/1998 | Sturges et al. | ................. | 710/72 |
| 5,890,015 A * | 3/1999 | Garney et al. | ................. | 710/62 |
| 5,910,742 A | 6/1999 | Synder et al. | | |
| 5,933,611 A * | 8/1999 | Shakkarwar | ................. | 710/100 |
| 6,012,115 A | 1/2000 | Chambers et al. | | |
| 6,092,210 A | 7/2000 | Larky et al. | | |
| 6,219,384 B1 * | 4/2001 | Kliza et al. | ................. | 375/258 |
| 6,343,364 B1 | 1/2002 | Leydier et al. | | |
| 6,762,635 B2 | 7/2004 | Bruhnke et al. | | |

(Continued)

FOREIGN PATENT DOCUMENTS
EP 1079305 2/2001
(Continued)

OTHER PUBLICATIONS

Anderson, Don; "Universal Serial Bus System Architecture, Second Edition" Jan. 1, 2001, Mindshare, Inc., pp. 42-43 and pp. 124-129.

(Continued)

*Primary Examiner* — Tanh Nguyen

(74) *Attorney, Agent, or Firm* — Stites & Harbison PLLC; Douglas E. Jackson

(57) ABSTRACT

The invention provides a method and apparatus for providing a synchronized multichannel universal serial bus, the method in one aspect comprising supplementing the signal channels in the USB specification to provide synchronization information from an external source, and in another aspect comprising observing USB traffic and locking a local clock signal of a USB device to a periodic signal contained in USB data traffic, wherein the locking is in respect of phase and/or frequency.

14 Claims, 6 Drawing Sheets

U.S. PATENT DOCUMENTS

| | | | |
|---|---|---|---|
| 6,775,724 | B2 | 8/2004 | Toshitani et al. |
| 7,174,475 | B2 * | 2/2007 | Lee et al. .................. 713/503 |
| 2001/0011914 | A1 | 8/2001 | Pomet |
| 2001/0040902 | A1 * | 11/2001 | Rao .......................... 370/519 |
| 2002/0124200 | A1 | 9/2002 | Govindaraman |
| 2003/0050989 | A1 * | 3/2003 | Marinescu et al. ......... 709/208 |
| 2006/0116853 | A1 * | 6/2006 | Rappaport et al. ......... 702/182 |

FOREIGN PATENT DOCUMENTS

| | | |
|---|---|---|
| EP | 1 185 013 A2 | 3/2002 |
| EP | 1 189 140 A1 | 3/2002 |
| JP | 2001-147706 | 5/2001 |
| JP | 2002016991 | 1/2002 |
| JP | 2002-164873 | 6/2002 |

OTHER PUBLICATIONS

Bassak, G, "USB Eases Data Acquisition," Test and Measurement World, Reed Business Information, Highlands Ranch, Co, US, vol. 18, No. 6, May 1998, p. 42.

Rowe, M. "USB Proves Ready for T&M Tasks," Test and Measurement World, Reed Business Information, Highlands Ranch, CO, US, vol. 19, No. 1, Jan. 1999, pp. 28-30, 32, 34, 36 and 38.

Japanese Patent Office, Japanese Office Action for Application No. 2004-520197, Issued Jan. 12, 2010.

European Patent Office, Extended European Search Report for EP Application No. 10181679, Nov. 29, 2010.

Chinese Examination Report for Chinese Patent Application No. 200910225197.8, Jul. 21, 2011, The Patent Office of the People's Republic of China, Beijing, China.

* cited by examiner

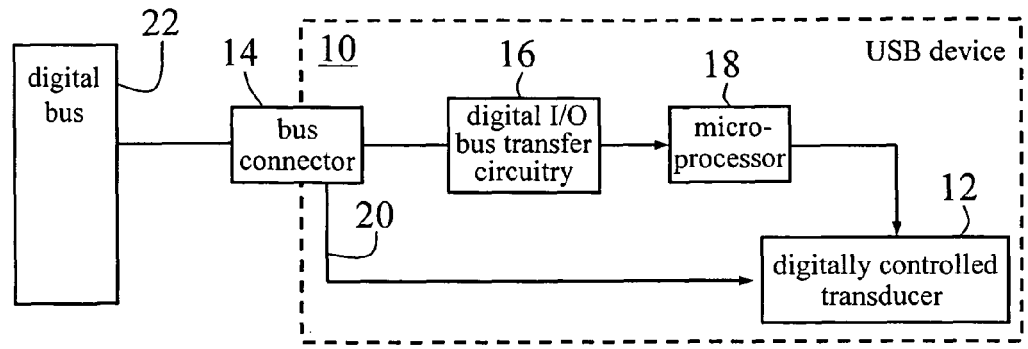
Figure 1 (*Prior Art*)
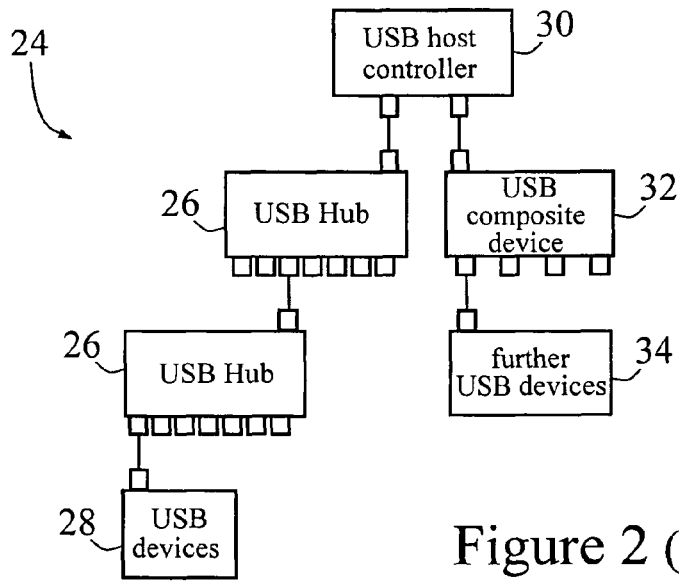
Figure 2 (*Prior Art*)
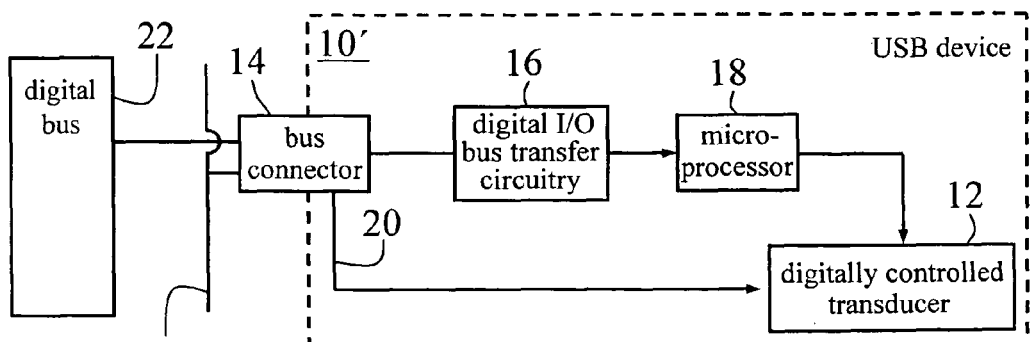
36: *external synchronization information source*
Figure 3

SYNCHRONIZED MULTICHANNEL UNIVERSAL SERIAL BUS

CROSS REFERENCE TO RELATED APPLICATIONS

This application is a divisional of application Ser. No. 10/620,769, filed Jul. 17, 2003 now U.S. Pat. No. 7,539,793, which claims benefit of provisional Application No. 60/396,099, filed Jul. 17, 2002 (both of which are hereby incorporated by reference.)

FIELD OF THE INVENTION

The present invention relates to a method and apparatus for synchronizing Universal Serial Bus (USB) devices, of particular but by no means exclusive application in synchronizing USB devices connected to a USB host with respect to each other and to an arbitrary precise degree.

BACKGROUND OF THE INVENTION

The USB specification is intended to facilitate the interoperation of devices from different vendors in an open architecture. USB data is encoded using differential signalling (viz. two wires transfer the information) in the form of the difference between the signal levels of those two wires. The USB specification is intended as an enhancement to the PC architecture, spanning portable, desktop and home environments.

By way of example, FIG. 1 is a schematic diagram of an illustrative prior art USB device 10 including a digitally controlled transducer 12. The device 10 includes a bus connector 14, digital I/O bus transfer circuitry 16, a microprocessor 18, and synchronization channel 20 for passing synchronization information including trigger and clock signals to the transducer 12.

The device 10 is connected by means of the bus connector 14 to a digital bus 22 containing USB and synchronization signals.

The USB specification implicitly assumes that all devices are different. While this is true for the intended environments, which connect devices from a multiplicity of manufacturers, there exist other environments (such as certain common industrial or laboratory environments) that require a specification for operating multiple devices of a similar nature in a synchronized manner. The specification does not sufficiently address this issue. Such environments are typically those where testing, measuring or monitoring is performed, which may require the devices to be synchronized to a more accurate degree than is specified. The USB specification allows limited inter-device synchronization by providing a 1 kHz clock signal to all devices. However, many laboratory and industrial environments require synchronization at MHz frequencies and above.

Referring to FIG. 2, USB employs a tiered star topology 24, where hubs 26 provide attachment points for USB devices 28. The USB host controller 30 contains the root hub, which is the origin of all USB ports in the system. The root hub provides a number of USB ports to which USB functional devices or additional hubs may be attached.

In turn, one can attach more hubs (such as USB composite device 32) to any of these ports, which then provide additional attachment points via ports for further USB devices 34. In this way, USB allows a maximum of 127 devices (including hubs) to be connected, with the restriction that any device may be at most 5 levels deep.

The root hub in the host transmits a Start of Frame (SOF) signal packet every 1.0 ms to every device, the time between two SOF packets being termed a frame. Each module receives this SOF packet at a different time, allowing for electrical delays inherent to USB topology. The topology implies that there may be a significant time delay (specified as at most 380 ns) for receiving the same signal between a device that is connected directly to the host controller and a device, which is 5 levels down. This is a severe restriction when there is a need to synchronize devices at MHz levels and above.

Current synchronization between a USB host and a USB device is possible by two types of USB transfers, Interrupt and Isochronous. Interrupt transfers allow guaranteed polling frequencies of devices with minimum periods of 125 µs, whereas Isochronous transfers guarantee a constant transfer rate. Both methods require there to be traffic between the device and host for synchronization to take place and therefore reserve more bandwidth for higher degrees of synchronization. This unfortunately means that the available USB bandwidth can be used up before the maximum number of devices has been connected. This approach also places on the host the great computational burden of keeping 127 devices synchronized to the host by means of software, yet still fails to address maintaining synchrony between the devices as to the host the individual devices represent separate processes.

Devices that contain a physical transducer of some kind, such as a laser diode or a photodetector, may require clock and trigger information. Such devices, such as a laser diode with a modulated light output at 1 MHz, may use a clock signal to perform transducer functions at regular intervals or at a constant frequency. A trigger signal is usually used to start or end an operation at a set time. In the laser diode example, a trigger signal could be used to turn the modulated light output on or off.

These clock and trigger signals or information (referred to below as synchronization information) can be used to synchronize a multiplicity of devices to each other, provided the signals are common and simultaneous to all devices. 'Common' and 'simultaneously' here mean that the variation in time of these signals between the devices is less than a specified quantity, $\delta t$. In the laser diode example, this would enable a multiplicity of laser diodes to modulate their light output at one frequency. The modulation frequency of all devices would be the same, and their waveforms would be in-phase. The current USB specification (viz. 2.0) allows for delays in $\delta t$ of up to 0.35 µs. For a signal with a frequency of 1 MHz and a period of 1.0 µs, this delay represents almost half of the period. It is thus unusable as specified as a synchronization signal for routine use.

Devices like hubs and USB controller chips commonly use some amount of phase locking in order to decode the USB protocol. It is the purpose of the SYNC pattern in the USB protocol to provide a synchronization pattern for another electronic circuit to lock to. However, this is intended to synchronize the device to the USB bit streams to an accuracy sufficient to interpret MHz bit streams. It is not intended to synchronize two separate devices with each other to an accuracy required by many test and measurement instruments. The USB specification—to the extent that it deals with inter-device synchronization—is mainly concerned with synchronizing a USB-CD audio stream sufficiently for output on a USB-speaker pair. The requirements of such an arrangement are in the kHz range and, for this, the USB provides ideal conditions. However, the specification does not address the potential problems of synchronizing 100 USB-speaker pairs.

U.S. Pat. No. 6,343,364 to Leydier et al. discloses an example of frequency locking to USB traffic, which is directed toward a smart card reader. This patent teaches a local, free-running clock that is compared to USB SYNC and packet ID streams; its period is updated to match this frequency, resulting in a local clock with a nominal frequency of 1.5 MHz. This provides a degree of synchronization sufficient to read the smart card information into the host PC. As this approach is directed to a smart card reader, inter-device synchronization is not addressed. Further, neither a frequency lock to 1 kHz or better stability nor high accurate phase control is disclosed.

U.S. Pat. No. 6,012,115 to Chambers et al. addresses the USB start of frame (SOF) periodicity and numbering for timing. As explained in the Abstract of U.S. Pat. No. 6,012,115, the disclosed invention allows a computer system to perform an accurate determination of the moment in time a predetermined event occurred within a real-time peripheral device by using the start of frame pulse transmitted from a USB host controller to peripheral devices connected to it.

U.S. Pat. No. 6,092,210 to Larky et al. discloses a method for connecting two USB hosts for the purpose of data transfer, by employing a USB-to-USB connecting device for synchronizing local device clocks to the data streams of both USB hosts. Phase locked loops are used to synchronize local clocks and over-sampling is used to ensure that data loss does not occur. This document, however, relates to the synchronization of two USB hosts with each other (and with limited accuracy), not to the synchronization of a multiplicity of USB devices to a single USB host.

The USB specification was written with audio applications in mind, and US Pat. No. 5,761,537 to Sturges et al. describes how to synchronize two or more pairs of speakers with individual clocks, where one pair operates off a stereo audio circuit in the PC and the other pair is controlled by the USB. Since both speaker pairs use their own clocks, they need to be synchronized so this document teaches one technique for maintaining synchronization of the audio signals despite possible clock skew between the asynchronous clocks.

Although the above is not intended to be exhaustive or to describe the common general knowledge in this area, it is clear that there are deficiencies in the current art.

SUMMARY OF THE INVENTION

Thus, it is an aim of this invention to supplement the USB specification by implementing mechanisms which allow any number of USB devices, up to the maximum allowed, to operate in a synchronized and triggered manner without placing a great computational burden on the host. This frees the host for other tasks such as control, data transfer, logging and analysis.

In addition to supplementing the USB specification, the present invention also has all the advantages of USB, such as the ability to operate multiple devices via a tree architecture (up to a current total of 127 devices), hot-swap ability, auto-enumeration, ease-of-use, cross-operating system compatibility, and portability.

The present invention provides a method and apparatus for synchronizing USB devices connected to a USB host with respect to each other. The present invention also provides a back plane that supplies common connection points and combinations of one or more of power, USB and synchronization signals to a variety of similar USB devices.

Specifically, the invention provides, in a first broad aspect, a method of providing a synchronized multichannel universal serial bus involving supplementing the wires (or equivalent— possibly wireless—signal channels) in the USB specification to provide synchronization information from an external source.

Preferably said synchronization information includes a trigger signal and a clock signal.

Thus, by providing such information from an external source, synchronization information can be provided at essentially arbitrary frequencies.

In a second broad aspect, the invention provides a synchronized multichannel universal serial bus comprising circuitry to observe USB traffic and to lock a local clock signal of a USB device to a periodic signal contained in USB data traffic.

Preferably the circuitry is adapted to lock said local clock signal to said periodic signal in phase, in frequency, or in both phase and frequency.

Preferably said circuitry is operable to decode and lock to USB Start of Frame (SOF) packet tokens (or other periodic data structure).

The invention also provides a method of synchronizing a multichannel universal serial bus, comprising:
  observing USB traffic; and
  locking a local clock signal of a USB device to a periodic signal contained in USB data traffic;
  wherein said locking is in respect of phase, of frequency, or of both phase and frequency.

In a third broad aspect, the invention provides a synchronized multichannel universal serial bus having circuitry to observe the USB traffic at a plurality of points in a USB tree and to measure a round trip time of each of a plurality of individual packets, to obtain relative phases of individual USB devices in said tree.

Preferably said circuitry is operable to measure the roundtrip time of an ACK packet associated with a particular transaction, whereby the relative phase of each device's local clock can be controlled so that all attached USB devices can be synchronized.

The invention also provides a method of synchronizing a multichannel universal serial bus, comprising:
  observing USB traffic at a plurality of points in a USB tree;
  measuring a round trip time of each of a plurality of individual packets; and
  determining relative phases of individual USB devices in said tree from said respective round trip times;
  whereby any phase offsets of said respective individual USB devices can be adjusted according to said determined relative phases.

In a fourth broad aspect, the invention provides a method of providing a synchronized multichannel universal serial bus comprising:
  issuing all devices in a USB topology with a trigger signal.

Preferably the trigger signal synchronously initiates or ceases operations on a plurality of devices.

Preferably said trigger signal is produced by using an SOF packet (preferably including encoded frame number), to trigger a transducer at a given time.

Preferably the method includes executing said operation in phase with a local oscillator.

This is preferred because, owing to the USB connection topology, the arrival times of the SOF packet can differ between devices and, in addition, the USB specification allows for significant temporal jitter in the SOF packet frequency with respect to the phase-locked local oscillator. This can result in the clock being out of phase by a fraction of a cycle.

The invention also provides a synchronized multichannel universal serial bus, comprising:

circuitry for issuing all devices in a USB topology with a trigger signal.

In a fifth broad aspect, the invention provides a synchronized multichannel universal serial bus including circuitry and logic to supply synchronization signals to USB devices at frequencies that correspond to national standards (such as NIST and NATA).

Indeed, this approach can be employed with the other aspects of this invention.

In a sixth broad aspect, the invention provides a synchronized multichannel universal serial bus including a USB back plane to provide to attachable devices any one or more of USB signals, power, sockets and synchronization information.

The bus may also provide a mechanically supportive structure.

Combinations of these aspects to synchronize devices to each other are also possible. Requirements of temporal accuracy, cost and ease-of-use may place restrictions on which of these methods can be used for a certain application. In addition, apparatuses according to the invention can be embodied in various ways. For example, such devices could be constructed in the form of multiple components on a PCB, or at the semiconductor level, that is, as a single silicon (or other semiconductor material) chip.

Thus, the invention also provides a method for locking the local clock of each of a plurality of USB devices within the same USB tree to substantially the same frequency, comprising:

generating or designating specific signal structures for transmission in the USB data traffic;

transmitting said specific signal structures to said USB device in a predefined sequence;

monitoring USB signals local to said USB device for said specific signal structures;

generating a local reference signal at each of said USB devices from said specific signal structures; and locking the frequency of said local clock signal at each of said USB devices to said local reference signal to a predetermined degree.

Preferably the specific signal structures are the USB Start of Frame packet token sequences as defined in the USB specification. Alternatively, the specific signal structures are command sequences sent to the USB device or data sequences sent to the USB device.

Preferably the method further includes generating said local reference signal for each of said specific signal structures.

Preferably the method further includes generating said local reference signal for substantially all of said specific signal structures.

Preferably the local clock frequency is substantially the same as said local reference signal frequency.

Preferably the locking of each of said local clock signals to said reference signal is for the purpose of generating a frequency with a stability better than that required for pure transfer of data between a host and a respective USB device.

Preferably the method further includes passively synchronizing said USB devices to an arbitrary degree by attachment said USB devices to a common USB hub by cables of substantially equal length.

The invention still further provides a method of measuring the propagation time of signals from a USB host to a USB device within a USB tree, comprising:

designating a master USB device in said USB tree;

generating or designating specified signal structures for transmission in the USB data traffic;

transmitting said specified signal structures to said USB device in a predefined sequence;

monitoring said USB traffic by means of said master USB device for said specified signal structures and for specified response signals from said USB device;

generating event triggering signals local to said master USB device corresponding to decoding of said specified signal structures;

generating event triggering signals local to said master USB device corresponding to decoding of response signals from said USB device;

measuring a time interval between said event triggering signals in said master USB device; and determining a propagation time from said USB host to said USB device from said time interval.

Preferably the master USB device is attached near the top of said USB tree.

Preferably the method further includes transmitting said specified signal structures to said USB device in said predefined sequence.

Preferably the specified signal structures comprise OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

Preferably the USB device is one of a plurality of USB devices, and said method includes determining a respective propagation time for each of said USB devices including statistically analyzing a plurality of such propagation determinations to improve accuracy of said propagation delay measurement.

The present invention yet further provides a method of determining the relative propagation delay of electrical signals or data structures between a plurality of USB devices connected to a common USB host, comprising:

determining respective propagation delays between each of said USB devices and said USB host according to the method described above;

designating one of said USB devices as a temporal reference device; and determining the difference in said propagation delay between said temporal reference device and each of said plurality of said USB devices.

The present invention also provides a method of synchronizing the local clocks of each of a plurality of USB devices connected to a common USB host via a USB tree so that said clocks are substantially in phase and at substantially the same frequency, comprising:

locking the local clock of each of said USB devices to substantially the same frequency according to the method described above;

determining the relative propagation delay of signals from said USB host to each of said USB devices with respect to a selected one of said USB devices according to the method described above, said selected one of said USB devices designated a reference USB device;

determining the relative phase of said local clock of each of said plurality of USB devices with respect to said local clock of said reference USB device according to the method described above;

determining the temporal adjustment or phase offset of each of said local clocks required to result in said plurality of local clocks across said USB tree being substantially in phase;

transmitting said temporal adjustment or phase offset from said USB host to said USB devices; and providing phase adjustment of said local clock on each of said USB devices according to said temporal adjustment or phase offset respectively.

Preferably each of the local clocks of at least some of said USB devices are shifted in phase by a desired amount, resulting in an array of USB devices with local clocks of known relative phases.

In addition, the present invention provides a method for synchronously triggering and thereby initiating or stopping one or more processes on a plurality of USB devices connected to a common USB host according to a predefined trigger command, comprising:

synchronizing the local clocks of each of said USB devices according to the method described above;

transmitting a predetermined trigger request signal and a predetermined trigger command signal in the USB data traffic, indicative respectively of a trigger request and of said trigger command;

monitoring said USB data traffic local to each of said USB devices for said trigger request signal and for said trigger command signal;

sending an initiating trigger request signal by means of said USB host to each of said USB devices to prepare said USB devices to execute said trigger request at substantially the same time;

configuring said USB devices to respond to said initiating trigger request signal by preparing themselves to perform said processes on receipt said trigger signal;

configuring said USB host to issue said trigger command to each of said plurality of said USB;

decoding said trigger command by means of said USB devices;

configuring said USB devices to execute said processes at substantially the same time; and whereby one or more processes within said USB devices can be initiated or stopped upon receipt of said trigger command signal from said USB host.

Preferably the trigger request signal comprises any of the USB packet signal structures defined in the USB specification, command sequences sent to the USB device, or data sequences sent to the USB device.

Preferably the method includes transmitting said trigger request signal and said trigger command signal in a predetermined sequence.

Preferably the trigger command signal comprises any of the USB packet signal structures defined in the USB specification, command sequences sent to the USB device, or data sequences sent to the USB device.

Preferably the local USB decoding device is a microcontroller, a microprocessor, a field programmable gate array or any other element capable of decoding data structures within said USB.

Each of the trigger request signal and the initiating trigger request signal preferably comprises OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

Preferably the trigger command is encoded into said USB traffic using a signal protocol defined within the USB specification.

Preferably each of said USB devices receives a clock signal from an external source.

Preferably the clock signals are received through an additional electrical or optical connector, or through wireless means.

The present invention further provides an apparatus for locking the local clock of each of a plurality of USB devices within the same USB tree to substantially the same frequency, comprising:

a signal generator for generating specific signal structures in the USB data traffic, for transmitting said specific signal structures to said USB device in a predefined sequence, and for generating a local reference signal at each of said USB devices from said specific signal structures; and a signal monitor for monitoring USB signals local to said USB device for said specific signal structures;

whereby said frequency of said local clock signal at each of said USB devices can be locked to said local reference signal to a desired degree.

The present invention also provides an apparatus for measuring the propagation time of signals from a USB host to a USB device within a USB tree, comprising:

a master USB device comprising one of the USB devices in said USB tree;

a signal generator or root hub for generating specified signal structures in the USB data traffic, for transmitting said specified signal structures to said USB device in a predefined sequence;

a signal monitor for monitoring said USB traffic by means of said master USB device for said specific signal structures and for said response signals; and a timer for measuring a time interval between said event triggering signals in said master USB device; and whereby a propagation time from said USB host to said USB device can be determined from said time interval.

Still further, the invention provides an apparatus for determining the relative propagation delay of electrical signals or data structures between a plurality of USB devices connected to a common USB host, comprising:

an apparatus for determining respective propagation times between each of said USB devices and said USB host as described above; and computing means for determining the difference in said propagation times between a reference USB device and each of said plurality of said USB devices.

wherein said reference USB device comprises one of said USB devices.

The invention in one embodiment provides an apparatus for synchronizing the local clocks of each of a plurality of USB devices connected to a common USB host via a USB tree so that said clocks are substantially in phase and at substantially the same frequency, comprising:

an apparatus for locking said local clock of each of said USB devices to substantially the same frequency as described above;

an apparatus for determining the relative propagation delay of signals from said USB host to each of said USB devices with respect to a reference USB device and for determining the relative phase of said local clock of each of said plurality of USB devices with respect to said local clock of said reference USB device as described above, said reference USB device comprising a selected one of said USB devices; and a timer for determining the temporal adjustment or phase offset of each of said local clocks required to result in said plurality of local clocks across said USB tree being substantially in phase;

wherein said apparatus is adapted to transmit said temporal adjustment or phase offset from said USB host to said USB devices and to provide phase adjustment of said local clock on each of said USB devices according to said temporal adjustment or phase offset respectively.

BRIEF DESCRIPTION OF THE DRAWINGS

In order that the present invention may be more clearly ascertained, embodiments will now be described, by way of example, with reference to the accompanying drawing, in which:

FIG. 1 is a schematic diagram of an illustrative prior art USB device;

FIG. 2 is a schematic diagram of a prior art USB tiered star topology;

FIG. 3 is a schematic diagram of a synchronized USB circuit according to a first embodiment of the present invention, in which synchronization information is passed to a device;

DESCRIPTION OF THE PREFERRED EMBODIMENTS OF THE INVENTION

Figure 4:
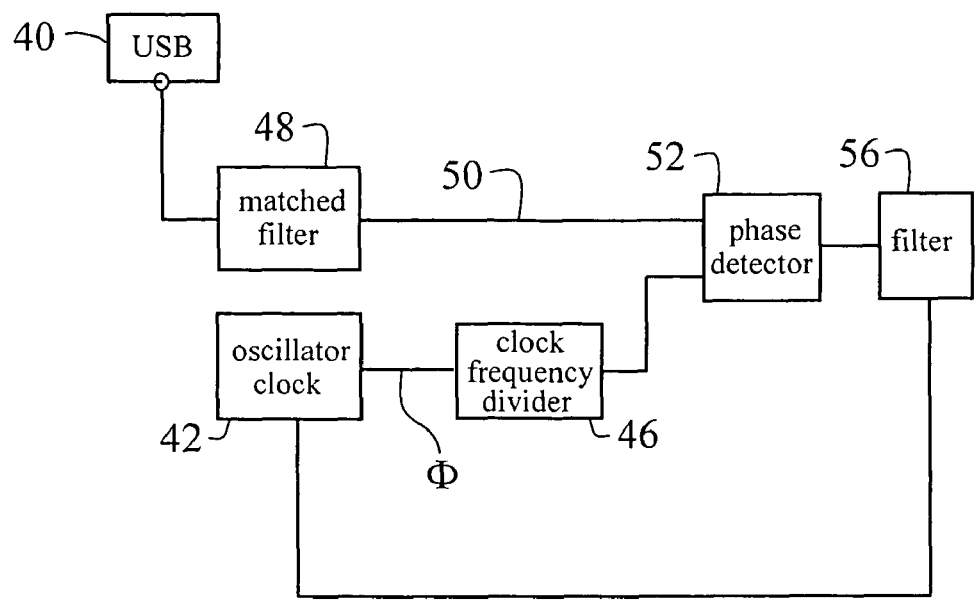
FIG. 4 is a schematic diagram of a synchronized USB circuit according to a second embodiment of the present invention, in which USB traffic is observed and the USB device's local clock signal is locked to the USB SOF packet in phase and frequency.

According to a first embodiment of the invention, the synchronization information is passed to the device. FIG. 3 is a schematic diagram of a USB device 10' (similar to that of FIG. 1, from which like reference numbers are adopted to refer to like features) including a digitally controlled transducer 12. According to this embodiment, however, the number of wires is increased to include a channel for providing synchronization information containing trigger and clock signals from an external source.

The synchronization information (including trigger and clock signals) is provided from an external source 36 to the bus connector 14, so that the synchronization information provided by synchronization channel 20 to the transducer 12 includes the externally provided synchronization information.

The device 10' thus does not contain logic or circuitry to generate synchronization information with regard to other devices.

USB communication is based on transferring data during regular 1 ms intervals called frames. A start of frame (SOF) packet is transmitted to all but low speed devices at the beginning of each frame (hence repetitively at 1 kHz) and therefore represents a low resolution synchronization signal for every device connected to one common USB port of the host. Thus, according to a second embodiment of the invention, the USB traffic is observed, and the USB device's local clock signal is locked to the USB SOF packet in phase and frequency.

As is well understood in the art, the USB specification defines several unique data structures called TOKENS which are used as packet headers for control and administration functions of the bus. The SOF packet has a unique digital signature, and can therefore be distinguished from other data, which may also be present on the bus. According to this embodiment, a logic circuit or matched filter may be used to decode the sequence of bits by which an SOF TOKEN is represented and issue a timing signal for every SOF packet present on the USB. Since the SOF occurs at a specified frequency and is common to all devices present, it and the decoded timing signal, can be used by all devices as a common frequency reference. In order to generate a frequency different to the 1 kHz of the SOF, a phase-locked loop (PLL) can be utilized to lock a local oscillator in frequency and phase to the SOF and timing signal. This has the added advantage, that the PLL can be used to average out jitter in the SOF time of arrival. Therefore, the frequency of the local oscillator need not be different to that of the SOF packet.

Referring to FIG. 4, the method of this second embodiment employs circuitry to observe traffic through USB 40 and decode all SOF packets. The signal $\Phi$ from a local controlled oscillator clock 42 is locked to the USB 1 kHz SOF packet in phase and frequency. This first requires the signal $\Phi$ from clock 42 to be divided by a clock frequency divider 46 down to the frequency of the SOF packet (e.g. from an output frequency of 1 MHz down to 1 kHz); matched filter 48 sends a clock synch signal 50 when a SOF packet arrives (nominally at 1 kHz), which passes to a phase detector 52. The phase detector 52 is coupled to the controlled oscillator clock 42 via a filter 56.

The local clock signal $\Phi$ is subsequently supplied to the transducer circuitry on the USB device, thus ensuring all devices attached to the root hub are locked in frequency.

According to this embodiment, it is possible to produce a clock signal stable to arbitrarily high frequencies, such as a clock frequency of tens of megahertz with stochastic jitter as low as a few nanoseconds. Thus, this embodiment allows one to ensure that the local clock of each device connected to a given USB is synchronized in frequency. However, it does not consider the synchronicity of those clocks. Each clock will be locked in frequency and phase to the receipt of the SOF TOKEN, but each device will receive the SOF packet at a substantially different time owing to differences in the signal propagation time of a randomly connected USB star topology. Synchronization of the local clock of each of a plurality of USB devices (such that all clocks are in phase) requires knowledge of said signal propagation time from the host to each device.

According to a third embodiment, the local clocks of each of a plurality of USB devices are synchronized to an arbitrary degree. The USB traffic is monitored at various attachment points in the USB tree and the propagation times of specific USB communication transactions are measured, to obtain and compensate for the phase differences between the local clocks of different devices that are due to electronic and cable delays. According to this embodiment, the roundtrip propagation time of a specific data packet from Host to Device and the associated USB acknowledgement ACK TOKEN from the Device for each device present are measured. This information is used to control the relative phase of each device's local clock, thereby synchronizing all attached USB devices to each other to an arbitrary degree.

The USB specification allows the local time of two devices to differ by up to 380 ns. However, if two independent devices are to accurately record the real time of the same event, their local time must be determined to an effectively arbitrarily precise degree.

Figure 5A:
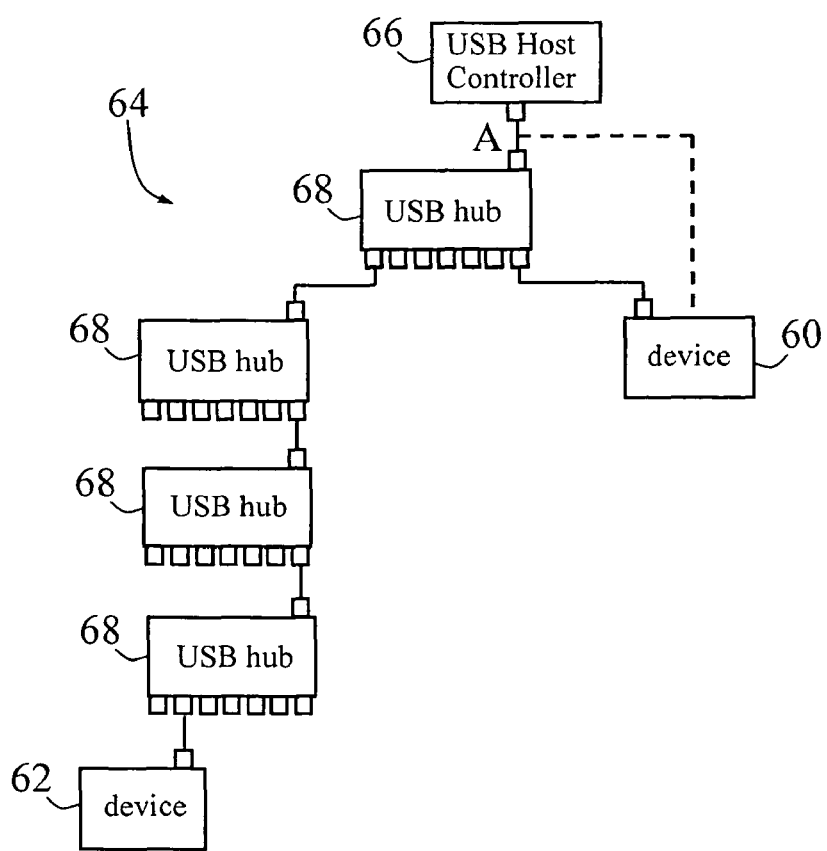
FIG. 5A is a schematic diagram of a synchronized USB circuit according to a third embodiment of the present invention, in which the roundtrip time of an ACK packet associated with a particular transaction is measured to control the relative phase of the local clock of each of a plurality of devices.

FIG. 5A depicts schematically two devices 60 and 62, which are attached at different points in a USB chain 64. USB chain 64 also comprises a USB Host Controller 66 and multiple 7 port USB hubs 68. Devices 60 and 62 will both receive the same periodic SOF signal to which they have independently locked their local clocks in frequency and phase. However, device 62 will receive the SOF packet later than device 60 owing to a topological time delay introduced by the greater number of USB hubs 68 between USB Host Controller 66 and device 62. This temporal difference needs to be calculated from time delay measurements and corrected for.

The particular attachment point of device 60 is unimportant provided it is located such that it can decode Bus traffic for itself and device 62 as shown by the symbol "A" on FIG. 5A (i.e. device 60 must be able to decode Bus traffic for all devices requiring synchronization). The connection point for device 60 is therefore preferably substantially near the top of the USB tree or chain, as shown in FIG. 5A.

In order to measure said round trip propagation time a USB transaction is conducted between the Host and device 62. Device 60 monitors USB traffic at point "A" in the tree and detects the passage of both the downstream and response data packets of the transaction. It is then possible for Device 60 to determine the period of time between detection of the downstream signal from the Host to device 62 (beginning of the transaction) and the response signal from device 62 to the Host (end of the transaction) at point "A" of FIG. 5A. In a preferable embodiment, the response signal from device 62 to the Host is an ACK TOKEN of a transaction acknowledgement ACK packet.

The round trip propagation time for a USB transaction between the Host and device 60 relative to point "A" can be determined in a similar manner. The connection topology based temporal phase shift between the frequency locked clocks in device 60 and device 62 is then given by substantially half the difference in the round trip propagation time for the two devices with respect to the same point "A". The frequency locked clock in device 62 is therefore phase delayed with respect to the frequency locked clock in device 60 by this amount. In order to synchronize the clocks in devices 60 and 62 in both frequency and phase, a phase offset corresponding to the said amount must be introduced into one of the clocks. This is most achieved by introducing a phase delay into the clock signal local to device 60.

Figure 5B:
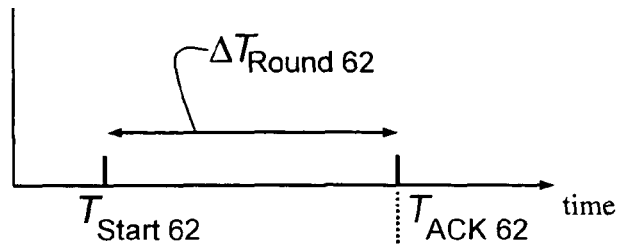
FIG. 5B is a timing diagram for the transaction of FIG. 5A for device 62.
Figure 5C:
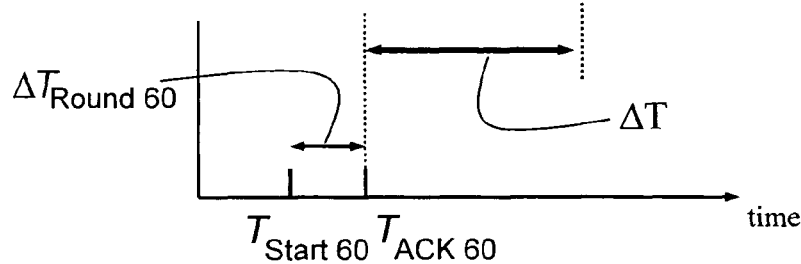
FIG. 5C is a timing diagram for the transaction of FIG. 5A for device 60.

FIGS. 5B and 5C further illustrate this approach. FIG. 5B is a timing diagram for the transaction of FIG. 5A for device 62, while FIG. 5C is a timing diagram for the transaction of FIG. 5A for device 60. The USB transaction starts for each device 60, 62 at $T_{start\ X}$ and ends when the device returns an ACK packet as shown by $T_{ACK\ X}$ (where in both cases X represents the device number). These transactions do not begin at the same time but the figures have been aligned with respect to $T_{start\ X}$ to show the relative duration of the transactions. Device 60 is much closer to the detection point "A" in FIG. 5A, so the round trip propagation time is significantly shorter than that for device 62. The difference in propagation time is shown as $\Delta T$. The phase offset between the two frequency locked clocks is therefore given by $\frac{1}{2}\Delta T$.

It will be clear to the skilled person that there are other methods of determining the required phase corrections. It will also be understood by the skilled person that other USB data protocols may be used for generating local clock frequency and determining either the round trip or one-way propagation time, including but not limited to any of the USB control and administration packet TOKENS (namely SOF, IN, OUT, ACK, NAK, PRE, STALL, DATA0, DATA1), any programmable sequences of bit patterns in the USB data packets, any user defined data structure or any signal protocol defined within the USB specification.

Above are described techniques for locking the local oscillators of USB devices in phase and frequency to achieve synchronous operation of a multiplicity of USB devices. This local oscillator generates a continuous modulation. The devices may also be required to synchronize a particular sequence of operations in time. The devices will therefore need a so-called common trigger signal to achieve this. This trigger signal can be used in conjunction with the frequency-locked local oscillator to achieve complete, synchronous operation of multiple, independent USB devices.

According to a fourth embodiment, a synchronous trigger signal for a transducer on a given device is produced by using the SOF packet including the encoded frame number, to trigger a transducer at a given time. However, owing to the USB connection topology, the arrival times of the SOF packet can differ between devices and, in addition, the USB specification allows for significant temporal jitter in the SOF packet frequency with respect to the phase locked local oscillator. This may result in the clock being out of phase by a fraction of a cycle. However, the trigger signal should be in-phase with the local oscillator.

To eliminate the problems of jitter the SOF signal is latched to the local oscillator. The latch registers the arrival of an SOF trigger request, but only produces a trigger signal when the local oscillator next changes state. The error in trigger times between different devices is a function of the device's local clock frequency and properties of the control loop and can be made arbitrarily small.

Figure 6:
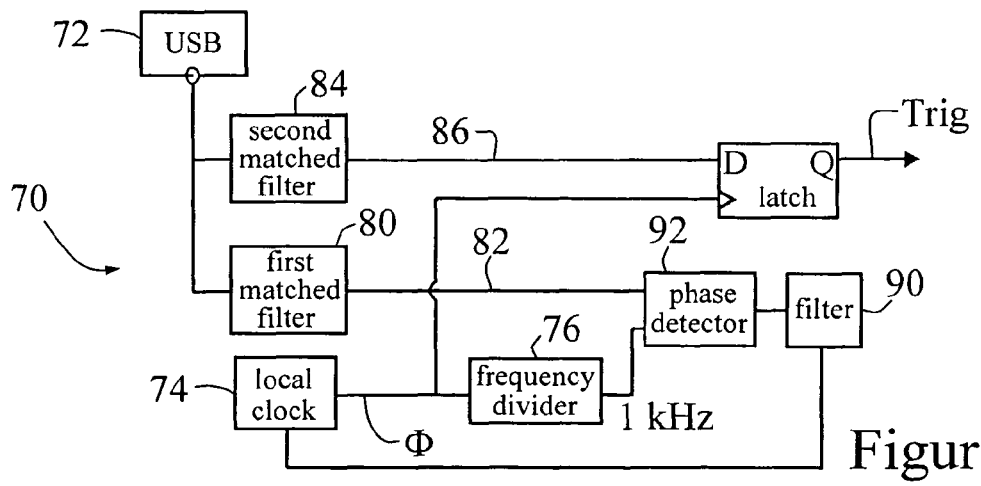
FIG. 6 is a schematic diagram of a synchronized USB circuit according to a fourth embodiment of the present invention, in which circuitry is provided for spying on a USB and locking the signal from a local clock to a SOF packet of USB in phase and frequency.

Thus, FIG. 6 is a schematic diagram of a circuit 70 for monitoring the USB 72 and locking the clock signal Φ from a local clock 74 (with output frequency downshifted to 1 kHz—if necessary—by clock frequency divider 76) to the 1 kHz SOF packet of USB 72 in phase and frequency. A first matched filter 80 sends a clock sync signal 82 when an SOF packet arrives in order to frequency and phase lock the local clock 74 (as in FIG. 4), while second matched filter 84 sends a trigger request signal 86 when an SOF packet with a specific frame number arrives. Like the circuit of FIG. 4, this circuit also includes a filter 90 and a phase detector 92. The trigger request signal is latched to the local stabilized local clock signal Φ to produce the synchronized trigger signal "Trig".

According to a fifth embodiment, circuitry and logic are used to supply synchronization signals to USB devices at frequencies which are traceable to national standards, such as NIST or NATA. This is achieved, for example, by replacing clocks and/or crystals in any of the hubs, including the root hub, with frequency references traceable to a national standard.

According to a sixth embodiment, a USB back plane is provided to supply—attachable devices—power, USB signals, connectors and synchronization information.

In its most complex state a USB back plane contains power additional to USB, making for self-powered devices, hub circuitry to provide a multiplicity of ports, a plurality of connectors associated with those ports providing a plurality of hot pluggable device attachment points and USB signals that satisfy the USB specification. It may also contain logic elements such as microprocessors, programmable arrays, and digital and analogue electronics to regulate and provide synchronization information including frequency, phase and trigger using various techniques described above, as well as power-on/off sequences. In addition to one or many hubs, a back plane can also contain devices that are attached to one of the USB ports provided by the Hubs. Alternatively, it can be a composite device that provides hub and synchronization functionality. In this way, synchronization information is measurable and programmable on-the-fly.

EXAMPLES

The above described embodiments can be employed in a variety of ways. These, however, can be divided into devices that supplement the USB connector terminals with synchronization terminals and those that do not. Additionally, the logic elements of the second to fifth embodiments can be located either on the USB device, on the back plane (if a back plane solution is desired), on both, or not be present at all.

It will be understood that, depending on the requirements of the application, one may or may not want to implement the back plane solution. The application also determines if additional power needs to be supplied to the devices.

Example 1

With No Additional Connector Wiring for Synchronization

Figure 7:
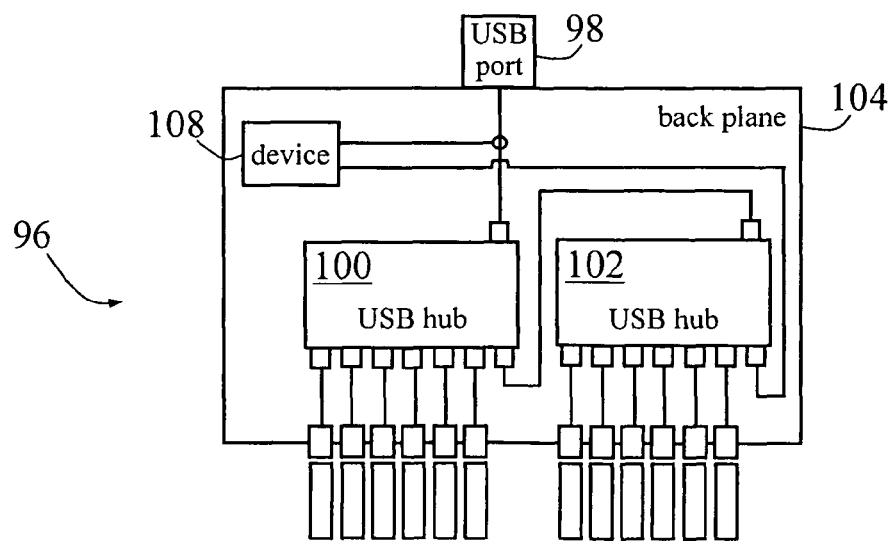
FIG. 7 is a simplified schematic diagram of one example of a synchronized USB circuit according to a combination of embodiments of the present invention, where synchronization is provided without additional connector wiring.

The advantage of a system according to the present invention that does not depend on supplementary synchronization signals is that the devices are not reliant on this information to work in a synchronized manner, and hence ordinary hubs can be used on any stand-alone host. Such a system can be extended to devices that require very accurate synchronization. Thus, an example of such a system is shown in FIG. 7 generally at 96, with upstream USB port 98 and a plurality of back plane hub devices 100, 102 (each, in this example, a 7-port USB hub on back plane 104), which may optionally supply additional power to a plurality of devices 106. Each device 106 may contain a local clock that is frequency and phase locked according to the above-described second embodiment. The back plane 104 and the hubs 100, 102 have the ability to time phase differences between devices 106 (each with random cable length according to the USB specification) by means of device 108 and the techniques described above in the context of the third embodiment. Furthermore, each device 106 contains a phase shift generator for the local clock that operates according to the techniques described above in the context of the third embodiment.

Example 2

Figure 8:
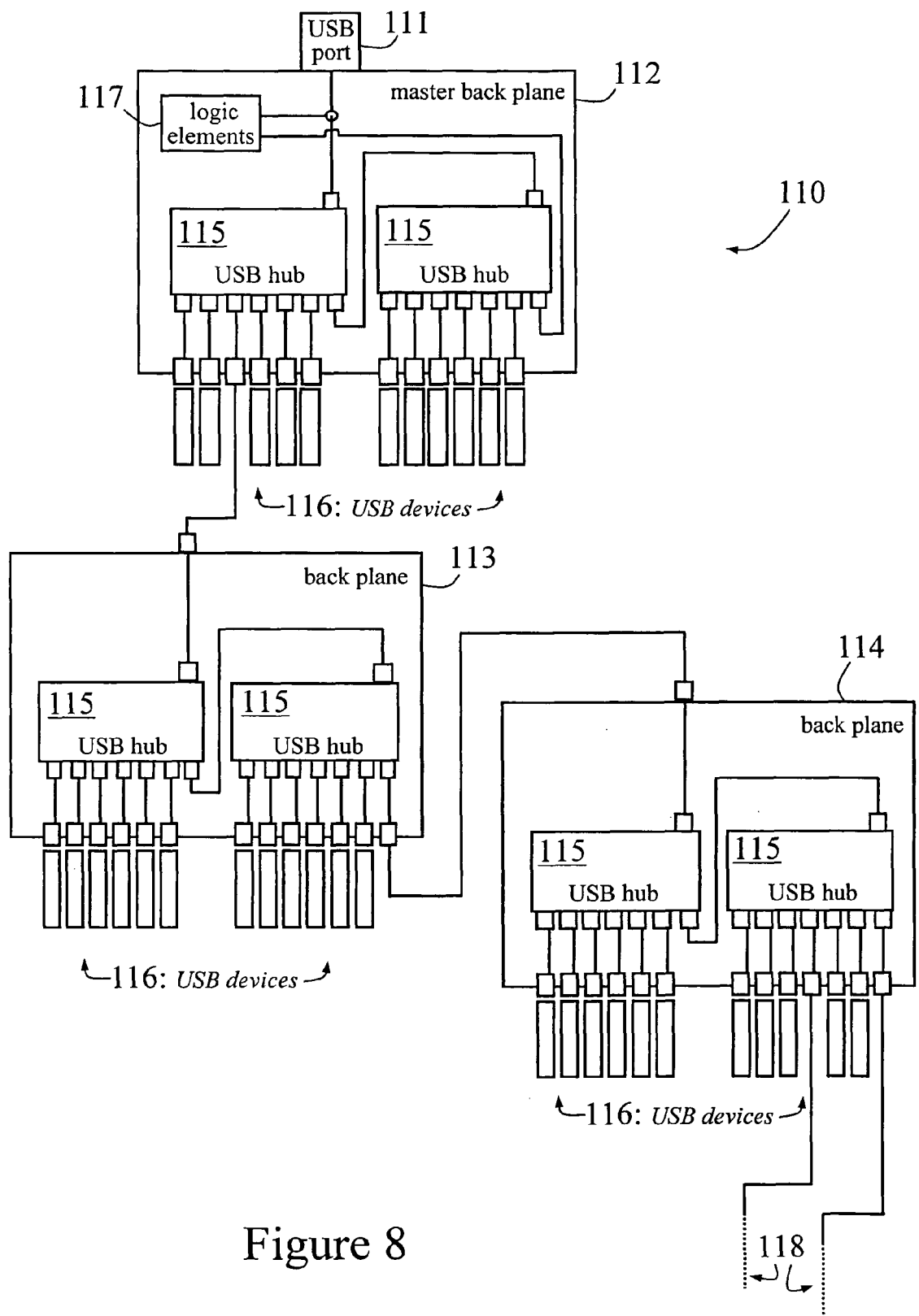
FIG. 8 is a schematic diagram of a complex synchronized USB circuit combining a plurality of embodiments of the present invention, where synchronization is provided without additional connector wiring.

A complex system comprising many synchronous USB devices is shown in FIG. 8 generally at 110. Upstream port 111 receives USB communication from the Host. The system 110 includes a plurality of back planes 112, 113, 114 each provided with two back plane hub devices 115. Each back plane hub devices 115 comprises a 7-port USB hub and may optionally supply additional power to a plurality of devices 116. Each device 116 may contain a local clock which is frequency and phase locked according to the above-described second embodiment. Further, first or master back plane 112 also has additional circuitry or logic elements 117 (as in FIG. 7), and has the ability to time phase differences between devices 116 (each with different connection topology) by means of elements 117 and the techniques described above in the context of the third embodiment. Furthermore each device 116 contains a phase shift generator for phase shifting the local clock using the techniques described above in the third embodiment. There may be additional devices and/or hubs and/or back planes connected to downstream ports 118 up to the maximum number of 127 devices defined in the USB specification.

In addition, the frequency provided by an upstream root hub may be generated by a frequency reference in accordance with the fifth embodiment and any trigger signals may be generated using the approach of the fourth embodiment.

Example 3

Additional Connector Wiring for Synchronization

Figure 9:
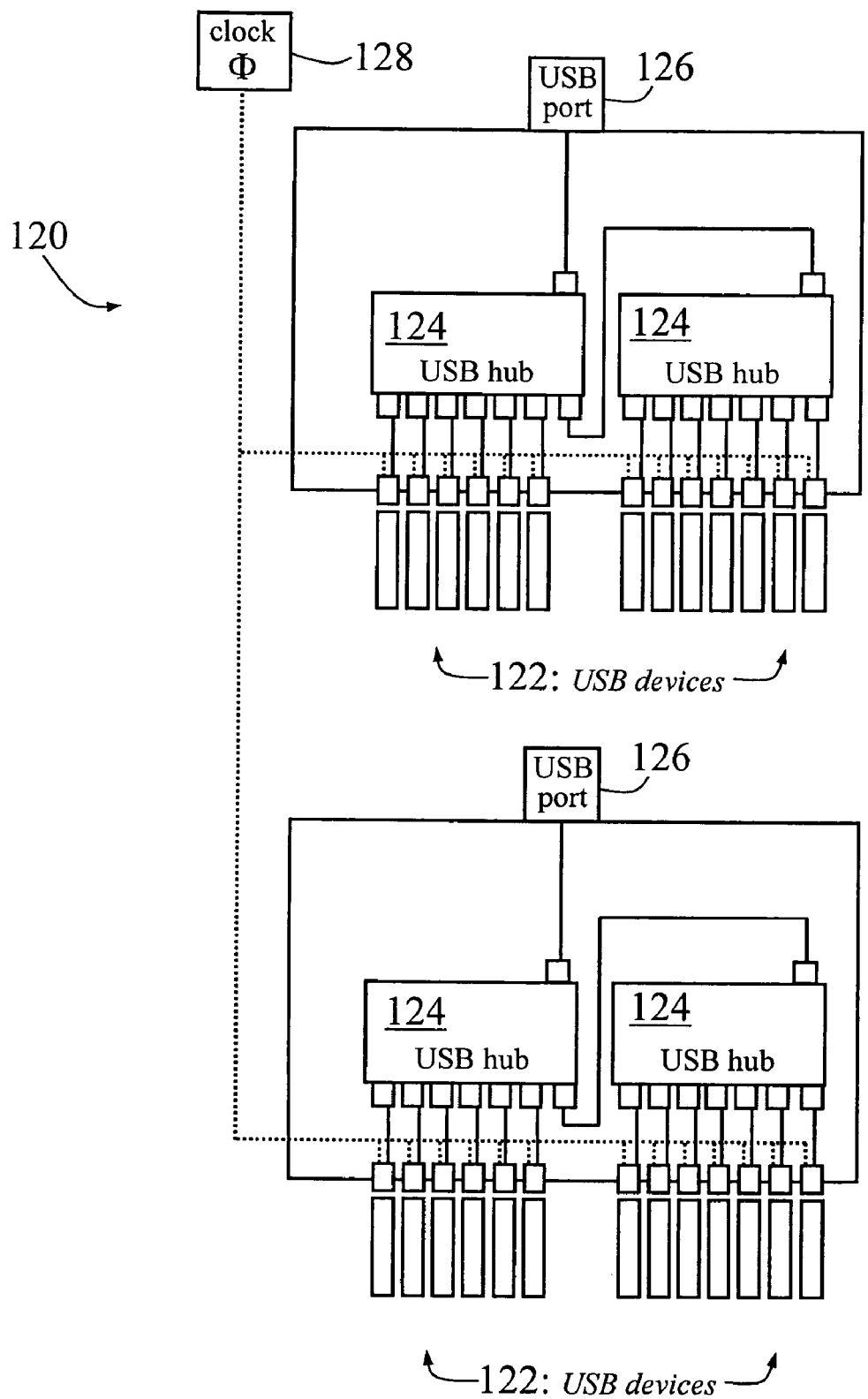
FIG. 9 is a simplified schematic diagram of another example of a synchronized USB circuit according to a combination of embodiments of the present invention, where synchronization is obtained with the use of additional connector wiring.

The simplest example of such an approach according to the above-described embodiments is achieved by connecting all devices to a common synchronization signal either through a proprietary connector containing USB and synchronization information or through a USB connector, as well as a separate synchronization link. The synchronization information is independent of the USB traffic and can therefore be of arbitrary frequency without any great difficulty. The medium for the synchronization information can be any of wireless, electrical or fiber optic means. FIG. 9 depicts schematically a practical example of such a circuit at 120. The circuit 120 includes, in effect, a pair of circuits each comparable to that of FIG. 7, so that 24 USB devices 122 are connected via 7-port USB hubs 124; these in turn can be connected to a PC via upstream USB ports 126. The USB connection topology has no influence on the synchronization signal, which is supplied separately to the devices by an external clock 128 of frequency Φ. Thus, the devices 122 are connected to the USB and the synchronization signal via either one connector (with connections in addition to the USB requirements) or a standard USB connector plus one or more additional connectors.

In a more complex form of this example, a back plane containing additional logic elements is used, the logic elements providing accurate control and lock in frequency and phase for all attached devices. In such an arrangement, the back plane logic elements observe USB traffic and generate their own local clock according to the approach of the above-described second and third embodiments. This back plane generated clock is then distributed to each attached USB Device through one or more backplane connectors described above.

Figure 10:
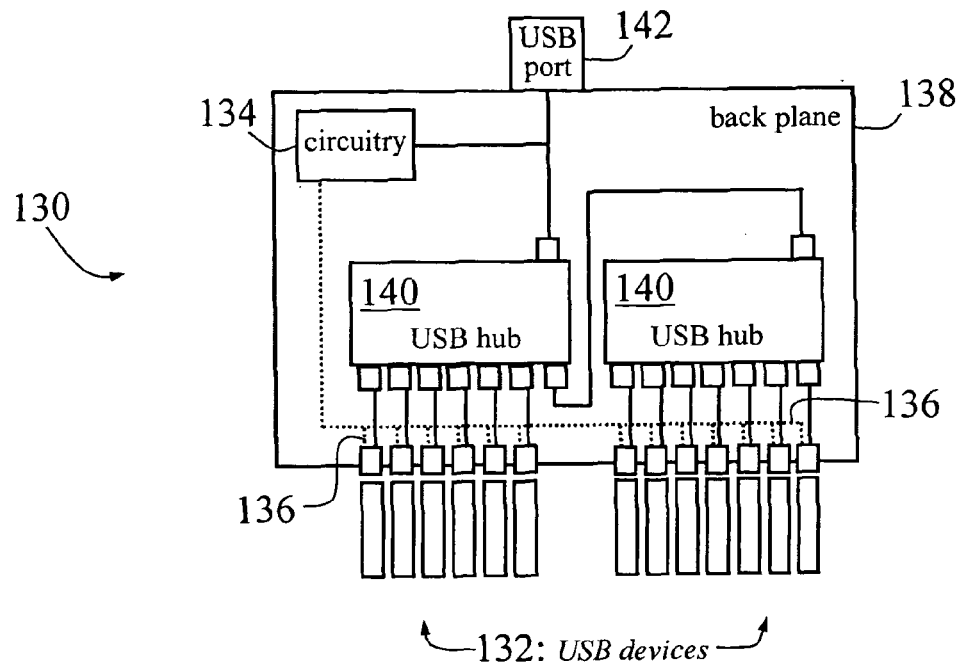
FIG. 10 is a simplified schematic diagram of a further example of a synchronized USB circuit according to a combination of embodiments of the present invention, comparable to but more complex than that of FIG. 8.

Referring to FIG. 10, therefore, which depicts such an arrangement generally at 130, each device 132 is connected to circuitry 134 through additional connector terminals 136 (electrical, wireless, fiber-optic), which supplement the USB specification. As an example, the circuitry could be located on a back plane 138 to which the various modules are connected. This back plane 138 also contains one or more 7-port USB hubs 140. The circuitry 134 monitors the USB at USB upstream port 142 for a start of frame signal and locks the frequency and phase of its internal clock to this signal (as per the second embodiment). The circuitry 134 can also arbitrarily delay the incoming clock signal, to account for delays due to USB topology (cf. the third embodiment). The internal clock is then made available to each device 132 via the additional connector terminal. In this way, all devices 132 receive a common clock signal to synchronize with.

Figure 11:
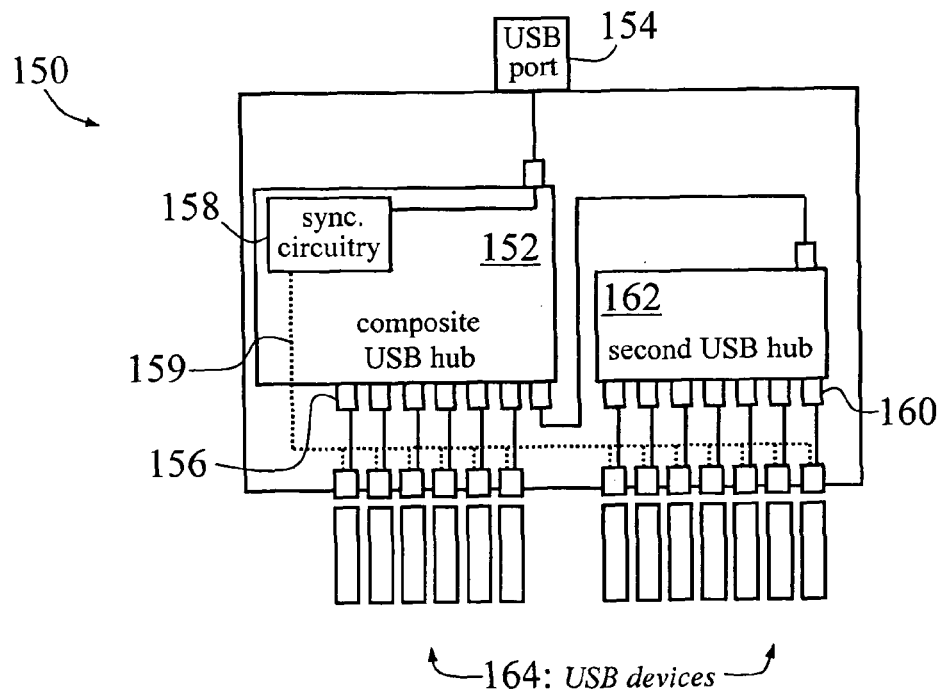
FIG. 11 is a simplified schematic diagram of a variation of the example of FIG. 10.

It should be noted that in the previously described figures, the synchronization circuitry is drawn separate to the hubs. In another variation, however, shown in FIG. 11 at 150, one hub is a composite device 152 (connected to USB upstream port 154), containing both expansion ports 156 and the synchronization circuitry 158 (which generates local clock signals according to embodiment two and using techniques described in embodiment three to provide phase shift of the local clock to provide synchronization with other devices), which frees up a port 160 of second hub 162 (when compared to the examples discussed above) so that—in the simple configuration shown in FIG. 11—up to 13 devices 164 can be attached.

It should also be noted also that the USB specification does not restrict the number of ports per hub to be seven. Hence in FIG. 10 there could be one hub 140 that services, for example, 12 ports.

Modifications within the spirit and scope of the invention may be readily effected by those skilled in the art. It is to be understood, therefore, that this invention is not limited to the particular embodiments described by way of example hereinabove. For the purposes of this specification it should be understood that the word "comprising" means "including but not limited to", and that the word "comprises" has a corresponding meaning.

Further, any reference herein to prior art is not intended to imply that such prior art forms or formed a part of the common general knowledge.

The invention claimed is:

1. A multichannel universal serial bus system comprising:
   (i) circuitry configured to observe USB traffic in a USB tree that comprises a USB host and a plurality of USB devices,
   (ii) circuitry configured to measure respective round trip times of a plurality of transactions, each of said transactions comprising a transmission of a data packet from said USB host to one of said plurality of USB devices and a transmission of a corresponding response data packet from said one of said plurality of USB devices to said USB host such that each of said round trip times comprises a time between dispatch by said USB host of a data packet and receipt by said USB host of a corresponding response data packet, said corresponding response data packet being generated by said one of said plurality of USB devices in response to receiving said data packet, said circuitry being configured to measure respective round trip times for each of the plurality of USB devices,
   (iii) circuitry configured to determine relative phases of respective local clocks of said USB devices with respect to a local clock of a reference USB device selected from said plurality of USB devices, each relative phase corresponding to each one of said plurality of USB devices other than the reference USB device, each relative phase being determined by calculating half the differences between said respective round trip times corresponding to said one of said plurality of USB devices and a round trip time corresponding to said reference USB device,
   (iv) circuitry configured to synchronize said USB devices in phase by adjusting phases of respective local clocks of at least some of said USB devices by phase offsets determined to result in respective local clocks of said plurality of USB devices in said USB tree being substantially in phase, and
   (v) circuitry configured to transmit a predetermined trigger command to one or more of said plurality of USB devices by said USB host in order to have said one or more of said plurality of USB devices in receipt of said trigger command decode said trigger command and start or stop executing one or more processes on a next change of state of respective local clocks of said one or more of said plurality of USB devices.

2. A multichannel universal serial bus system as claimed in claim 1, wherein said corresponding response data packets comprise ACK packets.

3. A method of synchronizing USB devices connected to a multichannel universal serial bus, the method comprising:
   observing USB traffic in a USB tree that comprises a USB host and respective said USB devices;
   measuring respective round trip times of a plurality of transactions, each of said transactions comprising a transmission of a data packet from said USB host to one of said plurality of USB devices and a transmission of a corresponding response data packet from said one of said plurality of USB devices to said USB host such that each of said round trip times comprises a time between dispatch by said USB host of a data packet and receipt by said USB host of a corresponding response data packet from one of said plurality of USB devices, said corresponding response data packet being generated by said one of said plurality of USB devices in response to receiving said data packet, said measuring including measuring respective round trip times for each of the plurality of USB devices; and
   determining relative phases of respective local clocks of said USB devices with respect to a local clock of a reference USB device selected from said plurality of USB devices, each relative phase corresponding to each one of said plurality of USB devices other than the reference USB device, each relative phase being determined by calculating differences between said respective round trip times corresponding to said one of said plurality of USB devices and a round tri time corresponding to said reference USB device;
   synchronizing said USB devices in phase by adjusting phases of respective local clocks of at least some of said USB devices by phase offsets determined to result in respective local clocks of said plurality of USB devices in said USB tree being substantially in phase;
   transmitting a predetermined trigger command signal indicative a trigger command to one or more of said USB devices b said USB host
   monitoring said USB traffic local to each of said plurality of USB devices for said trigger command signal; and
   said one or more of said USB devices in receipt of said trigger command signal decoding said trigger command signal and starting or stopping executing one or more processes on a next change of state of respective local clocks of said one or more of said plurality of USB devices after receipt of said trigger command signal.

4. A multichannel universal serial bus system as claimed in claim 1, wherein adjusting said phases of said respective local clocks of at least some of said USB devices includes adjusting the phase of each of said respective local clocks of said at least some of said USB devices.

5. A multichannel universal serial bus system as claimed in claim 1, further comprising:
 a master USB device comprising one of said plurality of USB devices in said USB tree, said master USB device containing said circuitry configured to observe USB traffic, said circuitry configured to measure respective round trip times of a plurality of transactions and said circuitry configured to determine relative phases of respective local clocks of said USB devices.

6. A multichannel universal serial bus system as claimed in claim 5, wherein said master USB device is attached near the top of said USB tree.

7. A multichannel universal serial bus system as claimed in claim 1, wherein said trigger command signal comprises any USB packet signal structures defined in a USB specification, command sequences sent to the respective USB device, or data sequences sent to the respective USB device, OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

8. A multichannel universal serial bus system as claimed in claim 1, wherein said system further comprises:
 circuitry configured to send a predetermined trigger request signal indicative of a trigger request by a USB host to each of said USB devices to prepare said USB devices to execute said trigger command;
 a signal monitor to monitor said USB data traffic local to each of said USB devices for said trigger request signal; and
 circuitry configured to respond to said trigger request signal by preparing to perform or stop performing one or more processes on receipt of said trigger command signal.

9. A multichannel universal serial bus system as claimed in claim 8, wherein said trigger request signal comprises any USB packet signal structures defined in a USB specification, command sequences sent to the USB device, data sequences sent to the USB device, OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

10. A method as claimed in claim 3, further comprising the step of:
 designating a master USB device in said USB tree, wherein said master USB device performs said steps of observing USB traffic in said USB tree, measuring respective round trip times of a plurality of transactions and determining relative phases of respective local clocks of said USB devices.

11. A method as claimed in claim 10, wherein said master USB device is attached near the top of said USB tree.

12. A method as claimed in claim 3, wherein said trigger command signal comprises any USB packet signal structures defined in a USB specification, command sequences sent to the respective USB device, or data sequences sent to the respective USB device, OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

13. A method as claimed in claim 3, further comprising the steps of:
 sending a predetermined trigger request signal indicative of a trigger request by said USB host to each of said USB devices to prepare said USB devices to execute said trigger command;
 monitoring said USB data traffic local to each of said USB devices for said trigger request signal; and
 configuring said USB devices to respond to said trigger request signal by preparing themselves to start or stop executing one or more processes on receipt of said trigger command signal.

14. A method as claimed in claim 13, wherein said trigger request signal comprises any USB packet signal structures defined in a USB specification, command sequences sent to the USB device, data sequences sent to the USB device, OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

* * * * *

UNITED STATES PATENT AND TRADEMARK OFFICE
CERTIFICATE OF CORRECTION

PATENT NO. : 8,285,897 B2  
APPLICATION NO. : 11/271799  
DATED : October 9, 2012  
INVENTOR(S) : Weigold et al.

Page 1 of 1

It is certified that error appears in the above-identified patent and that said Letters Patent is hereby corrected as shown below:

On the Title Page after item "(76) Inventors:" add the following item:

-- (73) Assignee: CHRONOLOGIC PTY LTD, Adelaide (AU) --

Signed and Sealed this  
Third Day of December, 2013

Margaret A. Focarino  
*Commissioner for Patents of the United States Patent and Trademark Office*

UNITED STATES PATENT AND TRADEMARK OFFICE
CERTIFICATE OF CORRECTION

PATENT NO. : 8,285,897 B2  
APPLICATION NO. : 11/271799  
DATED : October 9, 2012  
INVENTOR(S) : Foster et al.

Page 1 of 1

It is certified that error appears in the above-identified patent and that said Letters Patent is hereby corrected as shown below:

On the Title page, item (12) under United States Patent - Weigold, et al. should read as follows:
Foster, et al.

On the Title page, replace the item "(76) Inventors:" with the following field:

--(75) Inventors: Peter Graham Foster, Belair (AU), Clive Alexander Goldsmith, Northfield (AU), Patrick Klovekorn, Myrtle Bank (AU), Adam Mark Weigold, Unley (AU)--

On the Title page, after item "(75) Inventors:", add the following field:

--(73) Assignee: CHRONOLOGIC PTY LTD, Adelaide (AU)--

This certificate supersedes the Certificate of Correction issued December 3, 2013.

Signed and Sealed this  
Fourth Day of February, 2014

Michelle K. Lee  
*Deputy Director of the United States Patent and Trademark Office*